United States Patent
Champagne et al.

[11] Patent Number: 5,985,481
[45] Date of Patent: Nov. 16, 1999

[54] RESERVE BATTERY ASSEMBLY AND RELATED METHOD OF USE

[75] Inventors: Richard F. Champagne, San Diego; Robert Hotto, La Jolla; Burton M. Otzinger, Glendora, all of Calif.

[73] Assignee: Reserve Batteries Inc., Santa Monica, Calif.

[21] Appl. No.: 08/857,698

[22] Filed: May 16, 1997

[51] Int. Cl.⁶ .......................... H01M 10/48; H01M 6/36; H01R 3/00; H01R 4/48

[52] U.S. Cl. .......................... 429/90; 429/116; 439/500; 439/759; 439/504

[58] Field of Search .......................... 429/80, 116, 110, 429/113, 90, 91; 439/166, 174, 500, 504, 759, 764

[56] References Cited

U.S. PATENT DOCUMENTS

| | | |
|---|---|---|
| 3,009,007 | 11/1961 | Bryant, Jr. . |
| 3,043,897 | 7/1962 | Bond et al. . |
| 3,200,014 | 8/1965 | Roberts . |
| 3,222,225 | 12/1965 | Amiet et al. .............................. 136/90 |
| 3,433,678 | 3/1969 | Ockerman . |
| 3,536,536 | 10/1970 | Lucas ...................................... 136/114 |
| 3,575,726 | 4/1971 | Marsault . |
| 3,615,857 | 10/1971 | Methlie, II . |
| 3,619,298 | 11/1971 | Jammet et al. . |
| 3,712,834 | 1/1973 | Doe et al. . |
| 3,712,835 | 1/1973 | Kaye . |
| 3,735,232 | 5/1973 | Fister . |
| 3,770,511 | 11/1973 | Winterbottom et al. . |
| 3,785,872 | 1/1974 | Zaleski . |
| 3,785,873 | 1/1974 | Leeson et al. . |
| 3,894,888 | 7/1975 | Gold . |
| 3,930,885 | 1/1976 | Dey . |
| 3,953,239 | 4/1976 | Anderson . |
| 3,986,895 | 10/1976 | Szidon .................................... 429/113 |
| 4,005,246 | 1/1977 | Schiffer et al. ............................ 429/94 |
| 4,031,296 | 6/1977 | Sarbacher et al. ...................... 429/116 |
| 4,061,842 | 12/1977 | Evans ....................................... 429/116 |
| 4,150,198 | 4/1979 | Domeniconi et al. .................. 429/116 |
| 4,350,746 | 9/1982 | Chambers ............................... 429/121 |
| 4,433,036 | 2/1984 | Horning et al. ......................... 429/114 |
| 4,446,211 | 5/1984 | Goebel et al. ........................... 429/101 |
| 4,477,543 | 10/1984 | Björklund .............................. 429/115 |
| 4,588,662 | 5/1986 | McManis, III et al. .................. 429/52 |
| 4,605,604 | 8/1986 | Pollack et al. .......................... 429/116 |
| 4,612,264 | 9/1986 | Fairwood et al. ...................... 429/114 |
| 4,636,447 | 1/1987 | Tate ........................................ 429/121 |
| 4,668,592 | 5/1987 | Harris et al. ............................ 429/116 |

(List continued on next page.)

*Primary Examiner*—Maria Nuzzolillo
*Assistant Examiner*—Jonathan Crepeau
*Attorney, Agent, or Firm*—Morgan, Lewis & Bockius LLP

[57] ABSTRACT

A reserve, back-up battery assembly is described providing adequate voltage and power levels to replace a main battery for a limited period of time. The reserve battery assembly includes a housing, an electrolyte, an openable sealing mechanism, a plurality of pairs of anodes and cathodes, and first and second leads integrally connected to the first and second cable assemblies. The housing includes a fluid reservoir with an electrolyte solvent sealed within it, and it further includes a cell chamber containing the anodes and cathodes. The openable sealing mechanism releases the electrolyte solvent into a chute leading from the fluid reservoir to the cell chamber, and the chute contains anhydrous electrolytic crystals, for dissociation in the electrolyte solvent. The openable sealing mechanism also opens a vent passage extending between the fluid reservoir and the exterior of the housing. The anodes and cathodes may be made from Al and S, Al and AgO, or Al and $MnO_2$, respectively. The electrolyte may be made employing $H_2O$+KOH+Salt, or with NaOH or LiOH used in lieu of KOH. One of the cable assemblies includes a lug configured to receive a battery-cable connector, and that cable assembly has a detachable alligator-type jumper clip that normally is attached over the lug. The reserve battery assembly further includes an indicator for indicating whether the main battery should be bypassed before jumping.

9 Claims, 8 Drawing Sheets

U.S. PATENT DOCUMENTS

| | | | |
|---|---|---|---|
| 4,684,586 | 8/1987 | Haskins et al. | 429/115 |
| 4,684,587 | 8/1987 | Batson et al. | 429/115 |
| 4,684,588 | 8/1987 | Goebel et al. | 429/115 |
| 4,695,520 | 9/1987 | Koper et al. | 429/116 |
| 4,791,347 | 12/1988 | Britton | 320/2 |
| 4,794,058 | 12/1988 | Thiess | 429/116 |
| 4,800,141 | 1/1989 | Eppley et al. | 429/116 |
| 4,803,135 | 2/1989 | Garoutte | 429/116 |
| 4,861,686 | 8/1989 | Snyder | 429/90 |
| 4,925,750 | 5/1990 | Theiss | 429/116 |
| 4,950,565 | 8/1990 | Schisselbauer et al. | 429/116 |
| 4,968,567 | 11/1990 | Schisselbauer | 429/90 |
| 4,983,473 | 1/1991 | Smith | 429/48 |
| 5,004,654 | 4/1991 | Hunter et al. | 429/50 |
| 5,024,620 | 6/1991 | Bell | 439/759 |
| 5,024,904 | 6/1991 | Curiel | 429/27 |
| 5,068,162 | 11/1991 | Kulkarni | 429/116 |
| 5,083,076 | 1/1992 | Scott . | |
| 5,162,164 | 11/1992 | Dougherty et al. | 429/9 |
| 5,166,011 | 11/1992 | Rao et al. | 429/219 |
| 5,175,065 | 12/1992 | Lammers et al. | 427/114 |
| 5,196,276 | 3/1993 | Niksa | 429/52 |
| 5,214,368 | 5/1993 | Wells . | |
| 5,367,243 | 11/1994 | Wells et al. . | |
| 5,542,488 | 8/1996 | Nixon | 180/65.1 |
| 5,589,292 | 12/1996 | Rozon | 429/170 |
| 5,648,183 | 7/1997 | Licht et al. | 429/105 |

RESERVE BATTERY ASSEMBLY AND RELATED METHOD OF USE

BACKGROUND OF THE INVENTION

This invention relates generally to electrochemical energy sources and, more particularly, to battery assemblies capable of retaining electrochemical energy in a reserve state until activation.

In the use of systems requiring a main battery for electrical requirements, the retention and use of a back-up battery to provide for power upon failure of the main battery is highly preferred. Back-up automobile batteries, for example, are known to provide a backup source of power in the event of battery failure due to accidental discharge (such as leaving the lights on), battery malfunction (such as internal shorting), and battery limitations (such as weakness in extreme cold). A variety of back-up batteries have been designed, each with its own characteristics and limitations.

A main battery for an automobile is usually of the lead-acid type. A lead-acid battery provides a recharge capability superior to most battery types. It does not have a high specific or volumetric energy density, however, and necessarily must be a large and heavy battery. While a second lead-acid battery could be carried in an automobile to serve as a backup for the first, this solution is not generally practical for reasons of cost, space, weight, and limited shelf life without a recharge.

A back-up battery must provide adequate voltage and power levels to either replace or recharge the main battery for a limited period of time. Because the immediate need to use a back-up battery is not predictable, the back-up battery should have a long shelf life. Storage conditions of a back-up battery may vary, and therefore durability and safety are principal concerns. This is particularly true when the back-up battery contains more dangerous electrolyte fluids. Thus, it is preferable that the back-up battery be small, lightweight, durable, and not contain dangerous fluids. It is further desirable that the back-up battery be convenient to use in a variety of main battery failure scenarios. Furthermore, a preferable back-up battery should be inexpensive, and environmentally safe.

It is known that nickel-cadmium (NiCad), rechargeable back-up batteries, with jumper cable clips attached and stored in separate hinged-door compartments, are available for charging depleted batteries, powering portable television sets and radios, and the like. Such devices, while providing for short-term, portable power needs, do not have significant shelf life or power. They require frequent recharging, and eventually suffer performance degradation from that recharging.

In order to extend shelf life, back-up batteries have been designed as reserve electrochemical batteries for recharging main batteries. In a reserve battery, the electrolyte is stored separate from one or both types of electrodes, providing for an extended period of shelf life. Significant degradation of the electrodes generally does not occur until the reserve battery is activated by introducing electrolyte to the electrodes.

Nevertheless, whether reserve or not, back-up battery designs must trade off charging power level against the preference for reduced size, weight, cost, and safety concerns. Compact back-up batteries for automobiles have therefore been designed for slowly recharging a main battery rather than replacing it or jump-starting the automobile engine directly. An exemplary device is shown in U.S. Pat. No. 4,794,058, to Theiss. The Theiss device includes an ammeter for observing the progress of the charge, an expandable bag to store the electrolyte under pressure, and a frangible trigger member for activating the battery (i.e., conveying the electrolyte to the electrodes). Such a device, while conveniently small, would be expensive to manufacture due to its many intricate and expensive components (e.g., charge control circuitry and complex activation system). Furthermore, it is inconvenient to use, in that it takes an extended period of time to charge the battery. The user of the battery (e.g., the motorist) must wait patiently to regain the use of the main battery. Furthermore, such a battery does not provide assistance when the main battery is no longer capable of holding an adequate charge, such as when it is shorted out internally, or when it is significantly degraded, and at a very low temperature.

While the Theiss device uses a pressure feed system (the elastic bag) to deliver the electrolyte to the electrodes, other systems are also known. A spring-feed system is disclosed in U.S. Pat. No. 3,894,888, to Gold. A system driven by a tube of compressed gas is disclosed in U.S. Pat. No. 4,695,520, to Koper et al. Gravity-feed systems are also known in the art. U.S. Pat. No. 3,953,239, to Anderson, discloses a reserve battery comprising aluminum alloy and silver oxide electrodes and a pre-heated potassium hydroxide electrolyte.

Accordingly, there has existed a definite need for a back-up battery providing adequate voltage and power levels to replace a main battery for a limited period of time, and its related method of use. The back-up battery should have a long shelf life, high durability, and it should have a minimal risk of leaking dangerous chemicals. The back-up battery should be small, lightweight, and convenient to use in a variety of main battery failure scenarios. Furthermore, the back-up battery should be inexpensive, and environmentally safe. The present invention satisfies these and other needs, and provides further related advantages.

SUMMARY OF THE INVENTION

The present invention provides a reserve battery assembly with adequate voltage and power capability to replace a main battery for a limited period of time, and its related method of use. The reserve battery assembly has an indefinite shelf life and high durability, and it has little risk of leaking dangerous chemicals. It is small, lightweight, and convenient to use in a variety of main battery failure scenarios. Furthermore, it is inexpensive, and environmentally safe.

The reserve battery assembly of the invention includes a housing, an electrolyte, an openable sealing mechanism, a plurality of pairs of anodes and cathodes, and first and second leads. The housing has a fluid reservoir with a fluid sealed within it, and a cell chamber. The openable sealing mechanism prevents the fluid from entering the cell chamber, but, when opened, releases the fluid into the cell chamber, at which time the fluid serves as the electrolyte. The plurality of pairs of anodes and cathodes are disposed in the cell chamber so as to be submerged in the electrolyte when the fluid is released into the cell chamber. The first and second leads are integrally interconnected with the plurality of pairs of anodes and cathodes such that, when the fluid is released into the cell chamber, a predetermined voltage is provided between the leads.

In a more detailed feature of the invention, the reserve battery assembly further includes first and second cable assemblies, each cable assembly having a proximal end and a distal end, with the distal end including an alligator-type jumper clip. The first and second cable assemblies integrally connect to the first and second leads, respectively. The cable assemblies thus are integrally interconnected with the plurality of pairs of anodes and cathodes such that, when the fluid is released into the cell chamber, a predetermined voltage is provided between the cable assemblies.

This feature of the invention provides numerous advantages. The shelf life of the reserve battery assembly is indefinite, and the user may be assured of always having the cable assemblies available when the reserve battery assembly is needed. The integral configuration is conducive to attaching the cable assemblies to the main battery before opening the sealing mechanism. Dangerous sparking, and the risk of accidentally touching the charged cable assemblies, are thus avoided.

Furthermore, the cable assemblies may be specifically selected for the reserve battery assembly and are no longer than necessary, thus minimizing size, weight, and cost. The cable assemblies thus may be configured to be stored within the reserve battery assembly's housing, further adding to the convenience. In such a position, there is little risk of the cable assemblies becoming damaged or misplaced.

In another more detailed feature of the invention, the second cable assembly's distal end may include a lug configured to receive a conventional battery cable connector. Furthermore, the second cable assembly's alligator-type jumper clip is selectively attachable over the lug. An advantage of this feature is that, if the main battery has become shorted out or severely degraded, the main battery may be bypassed altogether. In particular, the cable connector that is connected over the main battery's positive terminal may be removed from that positive terminal and connected directly to the lug of the second cable assembly, for a superior connection. Another advantage of this feature is that the jumper clip has a superior connection when it is attached to the cable assembly, but is safely removed from the cable assembly when a bypass is being effected.

In yet another more detailed feature of the invention, the reserve battery assembly may include an indicator for indicating whether the main battery should be bypassed before jumping. The indicator includes one lead connected to the first cable assembly and another lead connected to the second cable assembly. Advantageously, and conveniently, the indicator is thus attached to the main battery at the same time as are the cable assemblies, simplifying its proper use before the sealing mechanism is opened.

A useful feature of the invention is that the lug and the indicator may be applied in using the invention to jump-start an automobile engine. Using a reserve battery configured such that its predetermined voltage is suitable for jump-starting the automobile engine, the jumper clips of the first and second cable assemblies are connected over the main battery's respective negative and positive terminals. The indicator is activated, and, if the indicator provides an indication that the main battery should be bypassed, then the cable connector connected over the main battery's positive terminal is removed from the positive terminal and connected over the lug of the second cable assembly. The sealing mechanism is then opened to activate the reserve battery, and the vehicle engine is started without further waiting. The power to start the engine comes from the connected and activated reserve battery.

This procedure simplifies an otherwise more complicated diagnostic procedure that most motorists would not follow before seeking to jump-start a vehicle engine. By performing this procedure, potential difficulties or failures are avoided from a main battery that has been shorted out. Furthermore, the motorist is warned that the main battery will not recharge from the alternator and that the vehicle must be taken in immediately for service.

A particularly advantageous feature of the invention is that the fluid sealed within the fluid reservoir may be an electrolyte solvent, such as salt water, rather than the electrolyte itself. The sealing mechanism includes a chute leading from the fluid reservoir to the cell chamber, the chute containing anhydrous electrolytic crystals for dissociation in the electrolyte solvent to form the electrolyte. The electrolyte solvent may, itself, be a less concentrated electrolyte.

This advantageous feature of the invention provides for an electrolyte to be stored in a form limiting its deleterious effect on other components of the reserve battery assembly during storage, and limiting the safety risks if the fluid leaks from the reserve battery assembly during storage. Furthermore, because the dissociation is exothermic, the resulting electrolyte is heated, enhancing the battery's electrochemical reaction. This is particularly useful when the reserve battery assembly is stored and used in cold environments.

Another feature of the invention is that the plurality of pairs of anodes and cathodes may be made substantially from aluminum (Al) and sulfur (S), Al and manganese dioxide ($MnO_2$), or Al and silver oxide (AgO), respectively. These electrode materials could provide for superior battery power levels in a small battery. They also provide for low environmental risks, because they avoid toxic materials.

When the plurality of pairs of anodes and cathodes are made from these materials, and used with an electrolyte that includes water and a hydroxide of potassium, sodium or lithium, the reserve battery assembly can be made extremely lightweight and compact, yet still can provide sufficient electrical current to jump-start conventional vehicle engines. A volume of less than 200 cubic inches, and preferably less than 150 cubic inches, can be achieved using the specified battery chemistry. This is substantially smaller than conventional automobile batteries. An electrical current generation capability of at least 200 amperes is ordinarily considered sufficient, although 300 amperes or even 400 amperes is more preferable in many circumstances.

Yet another feature of the invention is the providing of a vent passage between the fluid reservoir and the exterior of the housing, which opens upon the opening of the sealing mechanism. This facilitates the flow of the fluid from the fluid reservoir into the cell chamber, reducing the reserve battery assembly's activation time. It also serves as a secondary vent to the reserve battery assembly, further providing for safe operation.

Other features and advantages of the invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1A:
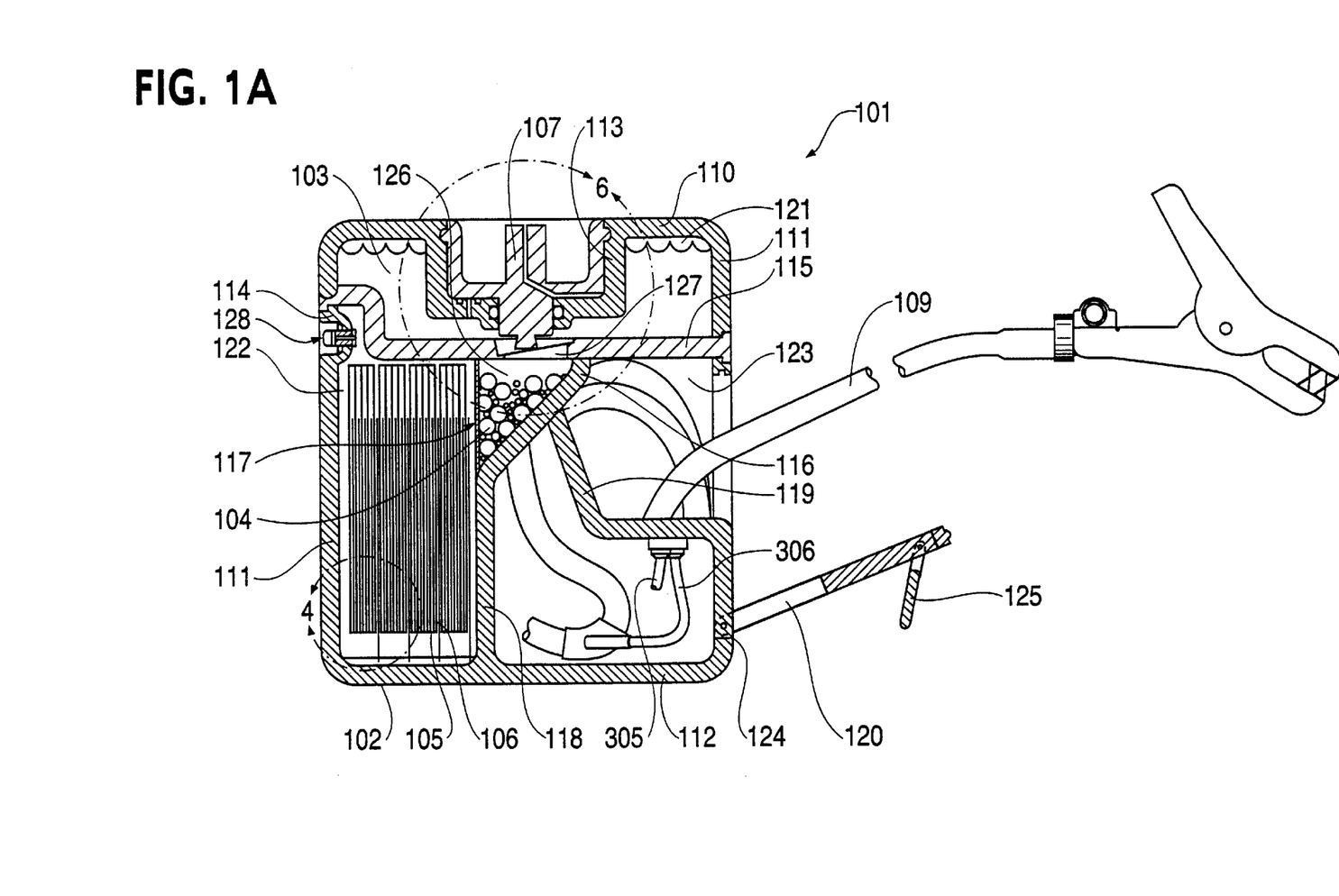
FIG. 1A is a cross-sectional side view of a reserve battery assembly, in a storage configuration, embodying features of the present invention.
Figure 1B:
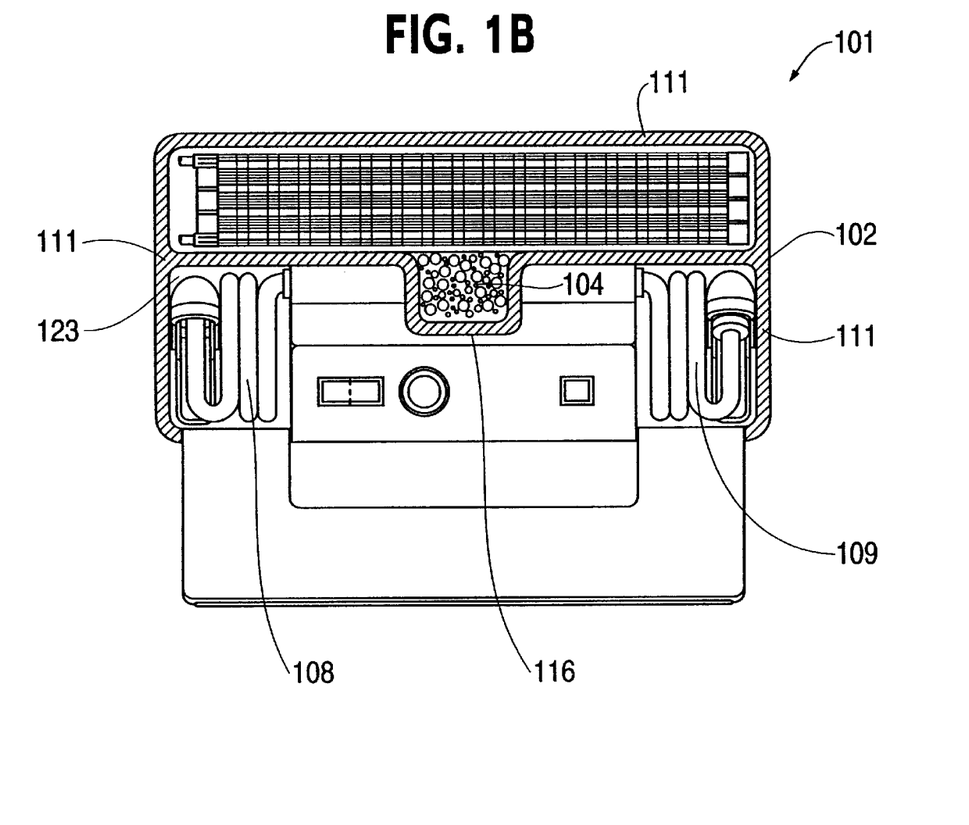
FIG. 1B is a cross-sectional top plan view of the reserve battery assembly depicted in FIG. 1A.

A reserve battery assembly 101 according to the present invention is shown in FIGS. 1A and 1B. The assembly includes a housing 102, an electrolyte solvent 103, anhydrous crystals 104 for dissociation in the electrolyte solvent, a plurality of pairs of anodes 105 and cathodes 106, an openable sealing mechanism 107, a first cable assembly 108, and a second cable assembly 109. As shown particularly in FIG. 1A, the housing includes a top wall 110, a plurality of side walls 111, a bottom wall 112, a cup-shaped knob receptacle 113 in the top wall, a vent receptacle 114 in one of the side walls, a divider wall 115, a mixing chute wall 116, a porous, screen-like membrane 117, a chamber wall 118, a cable-chamber wall 119, and a cable-chamber door 120 in one of the side walls. The housing is principally made of a durable, lightweight material, which is preferably polysulfone, polypropylene, or an equivalent thermoplastic.

The top wall 110, side walls 111, knob receptacle 113, and divider wall 115 combine to define a fluid reservoir 121 within the housing 102. The side walls, bottom wall 112, vent receptacle 114, divider wall 115, and mixing chute wall 116 combine to define a cell chamber 122 within the housing. The vent receptacle is located at or near the part of the cell chamber that is closest to the top wall, so as not to become submerged in electrolyte. The side walls, including the cable-chamber door 120, the bottom wall, the divider wall, and the mixing chute wall, combine to define a cable chamber 123 within the housing. The cable-chamber door includes a hinge 124 and a latch 125, allowing the cable-chamber door to open for access to the cable chamber. The cable chamber is subdivided into two cavities for housing the cable assemblies 108 and 109, and one additional cavity for housing certain electrical components described below.

The divider wall 115, membrane 117, and mixing chute wall 116 further define a chute cavity 126 within the cell chamber 122. The membrane divides the chute cavity from the remainder of the cell chamber. The divider wall defines a drain hole 127 that leads into the chute cavity, thus creating a passage from the fluid reservoir 121 to the cell chamber through the chute portion of the cell chamber.

The vent receptacle 114 is located in one of the side walls 111 that define the cell chamber 122. A vent valve 128, preferably of the Bunsen type, is located in the vent receptacle, and it is configured to vent the cell chamber at a pressure that is a predetermined amount higher than the pressure outside of the reserve battery housing 102.

Figure 2:
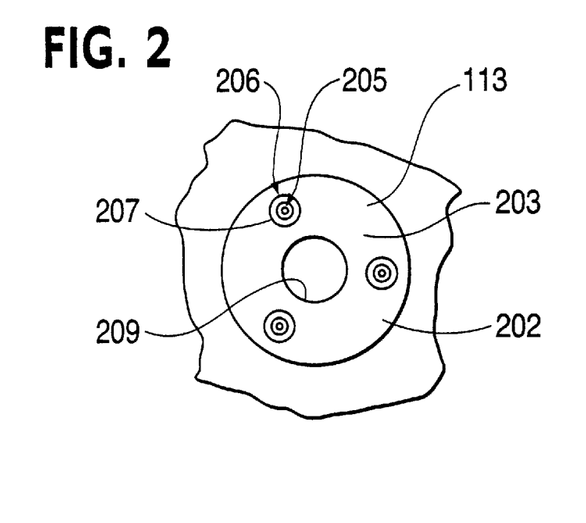
FIG. 2 is a partial top plan view of a housing, as found in the reserve battery assembly depicted in FIG. 1A.
Figure 3:
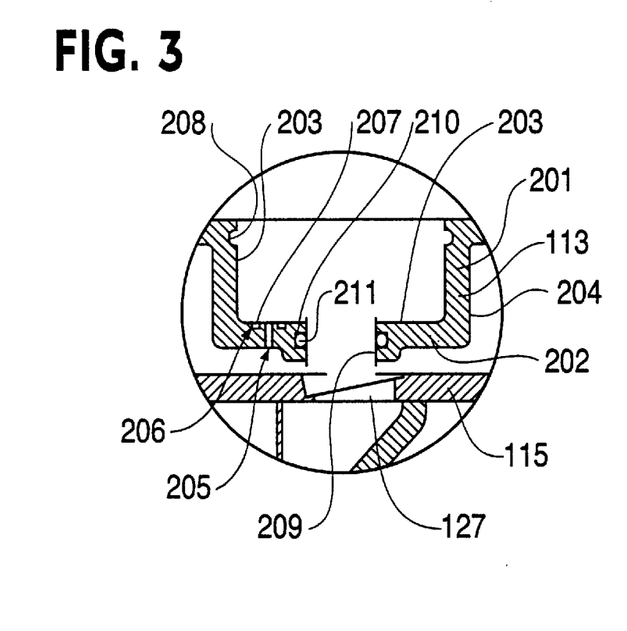
FIG. 3 is a cross-sectional, cut-away side view of the housing, as found in the reserve battery assembly depicted in FIG. 1A.

With reference now to FIGS. 2 and 3, the cup-shaped housing knob receptacle 113 is shown to have a cylindrical cup-wall 201 and a circular cup-base 202, the combination of which has an inner cup-face 203 and an outer cup-face 204. The cup-base defines three vent holes 205 extending between the inner cup-face and the outer cup-face. The inner cup-face of the knob receptacle includes a circular groove 206 encircling each vent hole, each groove receiving an O-ring 207.

The inner cup-face 203 of the cylindrical cup-wall 201 includes a circular groove 208 formed radially into the cup-wall. The cup-base 202 includes a knob hole 209 lying over the drain hole 127 in the divider wall 115. The knob hole has a radial groove 210 that receives an O-ring 211.

Figure 4:
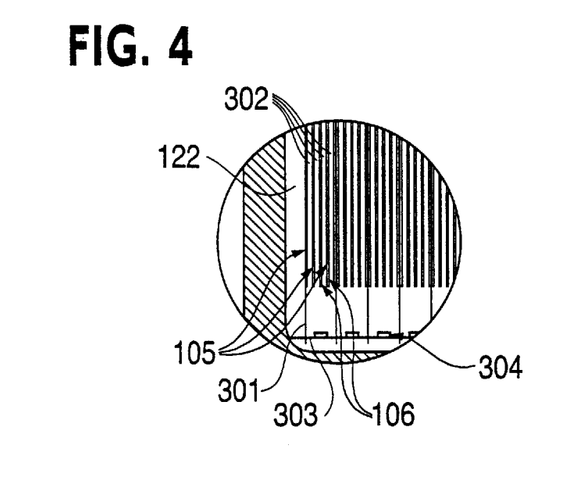
FIG. 4 is a cross-sectional, cut-away side view of the reserve battery assembly depicted in FIG. 1A, showing cell construction within reserve battery cells.

With reference now to FIGS. 1A and 4, the pairs of anodes 105 and cathodes 106 are shown to be contained within cells 301 that are located within the cell chamber 122, but not within the chute cavity 126. Each cell contains a plurality of alternately spaced anodes and cathodes, which are held apart by a plurality of spacers 302. There is one more anode than cathode in each cell. The cells and the anodes and cathodes are oriented in a generally vertical direction. Each cell is watertight, wrapped in intercell insulating tape 303, except for a plurality of electrolyte access holes 304 in the tape leading from the cell out into the cell chamber 122. The cell holes thus define a tortuous path from one cell to another, which minimizes leakage currents.

Within each cell 301, the plurality of anodes 105 are electrically interconnected to each other, and the plurality of cathodes 106 likewise are electrically interconnected to each other. The anodes and cathodes of each cell are interconnected in series with the anodes and cathodes of adjacent cells. The entire plurality of cells interconnected in series, connect to a first lead 305 and a second lead 306, which thus have a potential (when an electrolyte is present) at a predetermined voltage selected for jump-starting a vehicle engine having a depleted 12-volt main battery.

With reference again to FIGS. 1A and 1B, the first cable assembly 108 and the second cable assembly 109 are shown to have proximal ends that are integrally connected to the respective first and second leads 305 and 306, such that, when an electrolyte is present in the cell chamber 122, the cable assemblies provide the predetermined voltage. The cable assemblies each attach to one of the leads within one of the cavities of the cable chamber 123, and they may be stored therein. The cable assemblies also can be extended out the cable-chamber door 120 for attachment to the terminals of an automobile's main battery.

Figure 5:
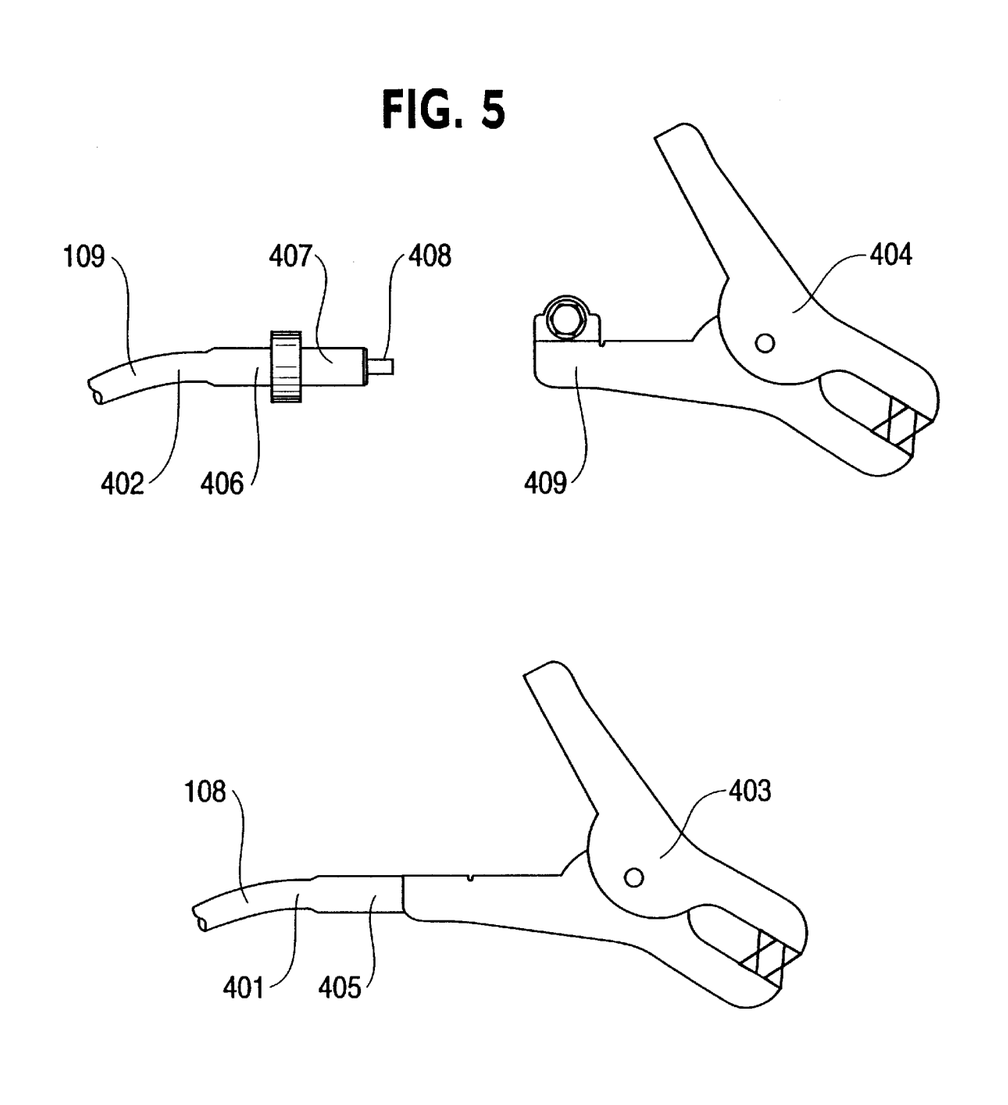
FIG. 5 is a partial elevational view of two cable assemblies, as found in the reserve battery assembly depicted in FIG. 1A.

With reference now to FIG. 5, the two cable assemblies 108 and 109 include cables 401 and 402, respectively, capable of safely carrying sufficient electrical current to start a vehicle engine, and further include alligator-type jumper clips 403 and 404 at their respective distal ends 405 and 406. The second cable assembly further includes a lug 407 configured for receiving a standard automobile battery-cable connector. The lug is sufficiently strong to have a standard automobile battery-cable connector clamped upon it, and it is preferably made from a solid post or a thick-walled cylinder of corrosion-resistant steel, brass, or the like. A threaded portion 408 is provided for automobile battery-cable connectors of the eyelet-lug type. This portion could be machined in, welded on, pressed in, or otherwise rigidly and electrically connected to the lug.

The jumper clip 404 of the second cable assembly 109 further includes a mechanism 409 for affixing it to the lug. This mechanism can be of any known type, such as bolt-tightened clamp, clip-on clamp, screw on, press fit, or the like. Preferably, the mechanism is bolt-tightened, with a bolt size the same as a standard automobile battery-cable connector bolt. A wrench may be included with the reserve battery assembly, for convenience.

Figure 6:
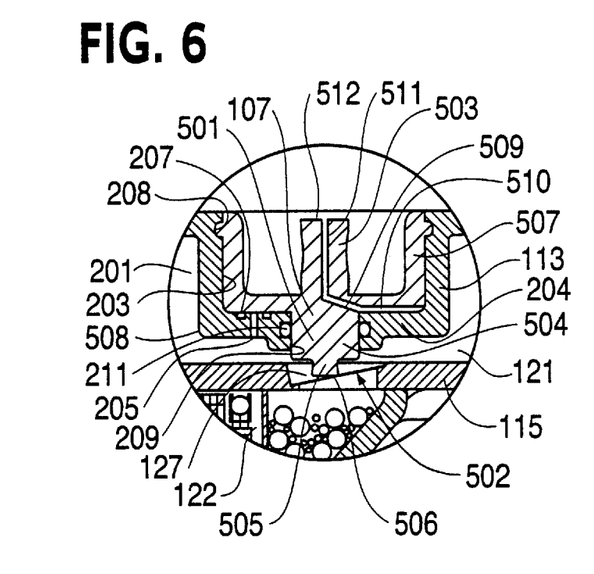
FIG. 6 is a cross-sectional, cut-away side view of the reserve battery assembly depicted in FIG. 1A, showing an openable sealing mechanism.
Figure 7:
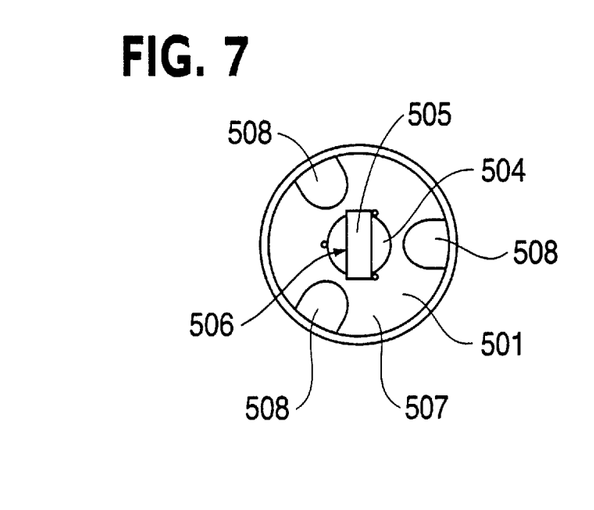
FIG. 7 is a bottom plan view of a knob, as found in the reserve battery assembly depicted in FIG. 1A.

The reserve battery assembly 101 has an initial storage configuration, and it can be changed to a activation configuration by opening the openable sealing mechanism 107. As shown in FIGS. 6 and 7, the openable sealing mechanism 107 includes a knob 501 and a frangible seal 502. The knob comprises a knob handle 503, a knob shaft 504 having a protrusion 505 with a cutting edge 506, and a knob flange 507. The knob flange conforms to, and is seated in, the inner cup-face 203 of the knob receptacle 113, including the circular groove 208 cut radially into the cup-wall 201. The knob shaft extends down through the knob hole 209 in the knob receptacle. The knob shaft conforms to the knob hole such that the knob hole O-ring 211 creates a watertight seal between the knob 501 and the knob receptacle, allowing the knob to rotate without breaking the watertight seal. The knob rotates from a storage position to an activation position, corresponding to the reserve battery storage configuration and activation configuration.

The knob 501 includes three sealing surfaces 508 protruding from the knob flange 507. The sealing surfaces are configured to seal against the O-rings 207 around each of the vent holes 205 when the knob is in the initial storage position. When the knob is in the activation position, however, the sealing surfaces are rotated out of contact with the O-rings.

The protruding sealing surfaces 508 are configured such that the O-rings 207 around each of the vent holes 205 do not seal against the knob 501 when it is in the activation position. Instead, three connecting, tortuous vent passages 509 are formed within the fluid reservoir 121, through the vent holes, through a gap 510 existing between the knob 501 and the knob receptacle's cup-base 202 (around the sealing surfaces 508), up through a knob vent hole 511 passing through the knob handle 503 to its top side 512, and out to the exterior of the housing 102. Thus, the fluid reservoir is not vented when the reserve battery assembly 101 is in the storage configuration, but is vented when the reserve battery assembly is in the activation configuration, thus preventing leakage or contamination of the solvent.

When the reserve battery assembly 101 is in its storage configuration, the seal 502 extends solidly over the drain hole 127 in the divider wall 115, creating a water and air-tight seal between the fluid reservoir 121 and the cell chamber 122. The cutting edge 506 on the shaft 504 of the knob 501 extends to a position proximate to the seal when the knob is in its storage position. The seal is positioned and angularly oriented with respect to the knob, such that the cutting edge cuts into the seal when the knob is rotated into the actuation position. Thus, the fluid reservoir is sealed from the cell chamber 122 when the reserve battery assembly is in the storage configuration, but it is in communication with the cell chamber when the reserve battery assembly is in the activation configuration.

With reference again to FIG. 1A, which shows the reserve battery assembly 101 in its initial storage configuration, the electrolyte solvent 103 is located in the fluid reservoir 121, which is completely sealed. At the same time, the anhydrous electrolytic crystals 104 are located in the chute cavity 126, held in place by the uncut seal 502 and the porous membrane 117. In this position, the reserve battery provides for safe handling and transport, particularly because the electrolyte solvent is not very caustic or acidic. The electrolyte is formulated to resist freezing in the expected extremes of temperature and humidity of an automobile trunk. Preferably, the cell chamber 122 is sealed with an atmosphere of dry nitrogen ($N_2$), to prevent premature oxidation or corrosion of the anodes 105 and cathodes 106, and to prevent hydration of the electrolyte crystals 104.

Figure 8:
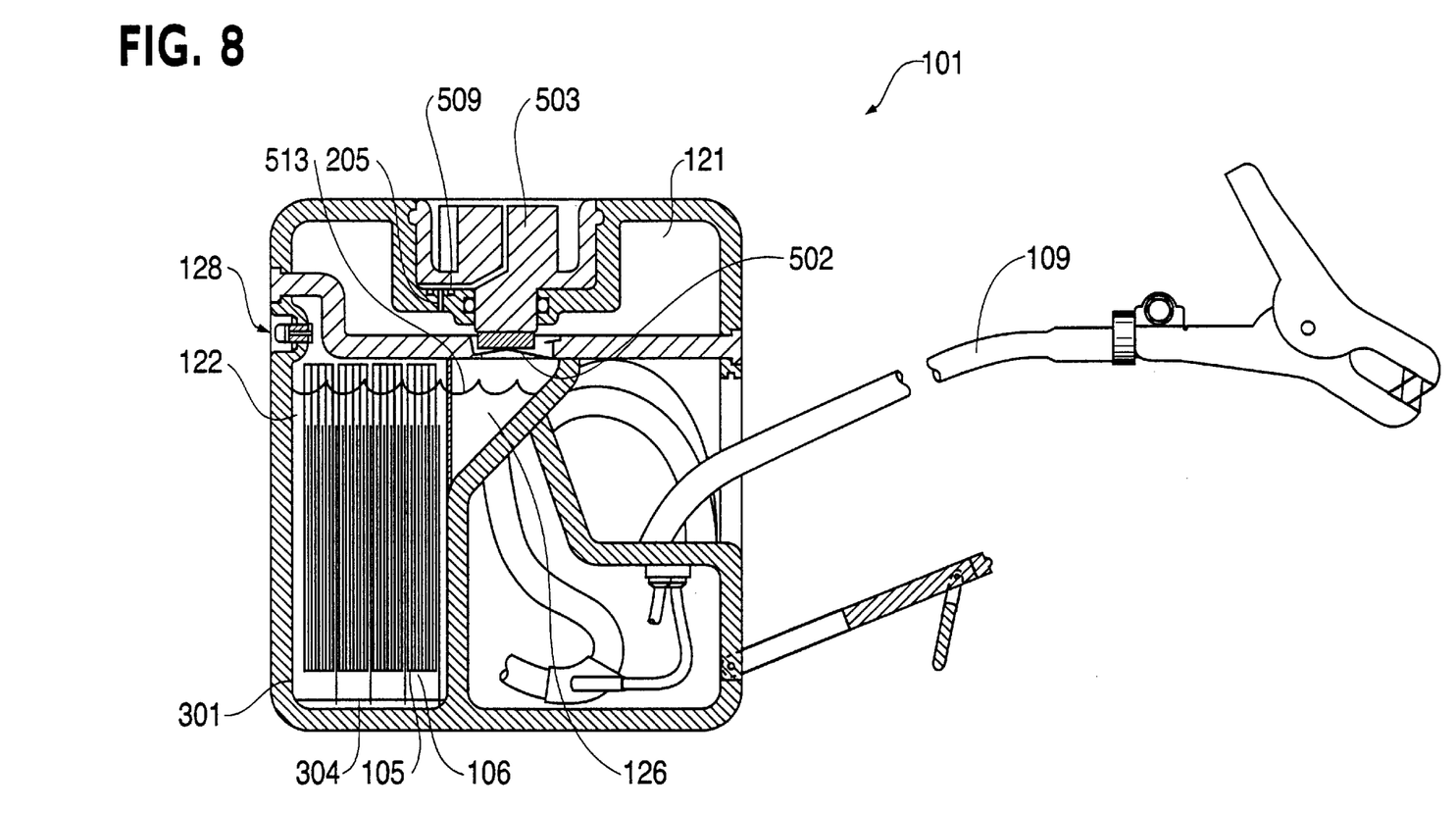
FIG. 8 is a cross-sectional side view, in an activation configuration, of the reserve battery assembly depicted in FIG. 1A.

With reference now to FIG. 8, when the knob handle 503 is rotated into the activation position, cutting the seal 502, the electrolyte solvent is released from the fluid reservoir 121, passing down into the cell chamber 122 via the chute cavity 126, under the force of gravity. The vent passages 509 through the knob receptacle vent holes 205 open and vent the fluid reservoir, to speed the passage of the electrolyte solvent into the cell chamber.

In the chute cavity 126, the electrolyte solvent dissolves the anhydrous electrolytic crystals 104, creating a fully concentrated and effective electrolyte 513 in the cell chamber 122, preferably filling the cell chamber. Any gas produced during the process of dissolving the anhydrous electrolytic crystals may be vented through either the vent passages 509 passing through the knob receptacle vent holes 205, or the vent valve 128. The mixing process is exothermic and thus heats the fully concentrated electrolyte, to provide for enhanced electrochemical reaction in the reserve battery assembly 101 until the heat dissipates. This feature is particularly useful during cold weather, when vehicle battery effectiveness is generally lower. The use of a weak acid as the electrolyte solvent will further enhance the heat of solution with the caustic electrolytic crystals.

The anodes 105, cathodes 106, and electrolyte 513 preferably have a chemistry providing a high specific and volumetric energy density. The following Table identifies several preferred chemistries, which are all rated as environmentally "green."

TABLE

| ANODE | CATHODE | ELECTROLYTE | GREEN STANDING |
|---|---|---|---|
| Aluminum (Al) | Sulfur (S) | $H_2O$ + KOH + Salt | G |
| Al | Silver Oxide (AgO) | $H_2O$ + KOH + Salt | G |
| Al | Manganese Dioxide ($MnO_2$) | $H_2O$ + KOH + Salt | G |

Note: sodium hydroxide (NaOH) or lithium hydroxide (LiOH) may be used in lieu of potassium hydroxide (KOH), with good results.

Green Battery Definition: Absence of mercury, cadmium, bromine, lead, and other toxic materials in battery construction.

Most preferred is the Al-AgO chemistry, with the Table listing in decreasing order of performance based on potential energy density. The preferred electrolyte is an aqueous solution of 10 to 50% concentrated KOH.

The fully concentrated electrolyte 513 preferably fills most of the cell chamber 122, entering the cells 301 through the cell holes 304 and submerging the anodes 105 and cathodes 106. The level of the electrolyte is below the level of the inter-electrode connections. The anodes and cathodes are polarized, such that the first and second cable assemblies 108 and 109 provide the predetermined voltage level for charging a vehicle's battery. Gasses built up during the reserve battery's reaction can be dissipated through the vent valve 128 or, secondarily, through the vent passages 509.

Figure 9:
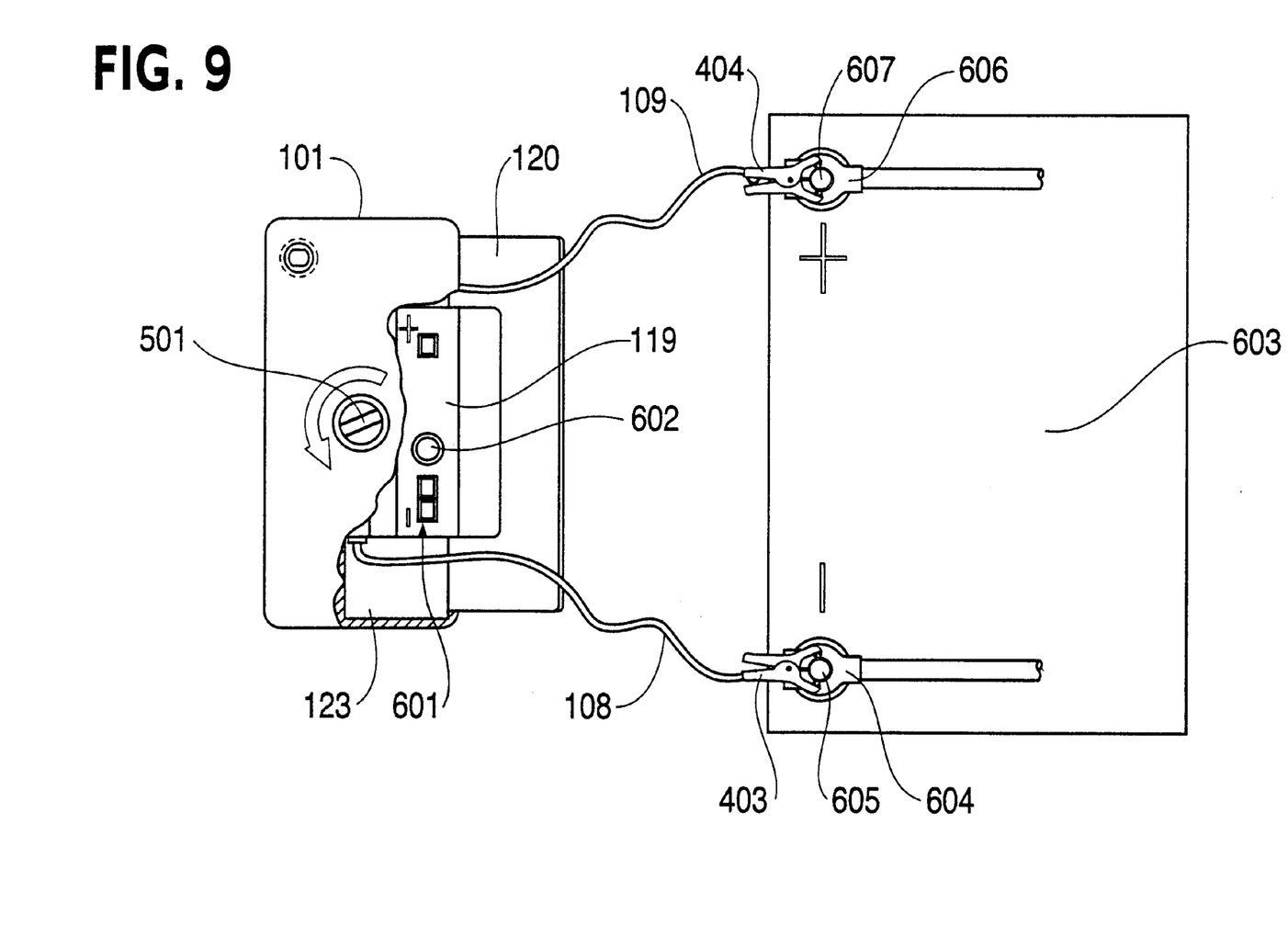
FIG. 9 is a top plan view of the reserve battery assembly depicted in FIG. 1A, connected to a vehicle with a main battery in the circuit.

With reference now to FIG. 9, the reserve battery 101 is shown to further include a START-mode button 601 and a START-mode indicator 602, which are mounted in the cable-chamber that does not contain a cable assembly. The START-mode button is an intermittent switch that is normally OFF, but that is ON when depressed. The START-mode indicator is a passive voltage meter connected between the cable assemblies 108 and 109, with one lead of the meter connected to the second cable assembly and the other lead of the meter connected to the first lead of the button. The second lead of the button is connected to the first cable assembly. Thus, depressing the button connects the voltage meter across the cable assemblies. When the button is released, the voltage meter is automatically deactivated.

The voltage meter 602 preferably takes the form of a lamp that is illuminated green at a predetermined voltage level, indicating that the main battery is still functional. If the predetermined voltage level is not present, the lamp illuminates red. Other metering devices, such as an electrochemically sensitive strip, alternatively can be used.

Prior to use, the reserve battery assembly 101 is maintained in its storage configuration. A protective detent (not shown) may optionally be used over the knob 501 during storage, to prevent premature activation. The reserve battery assembly has volume of less than 200 cubic inches, and preferably less than 140 cubic inches. This latter value is less than about one third the volume of traditional automobile batteries. In addition, the reserve battery assembly weighs only about five pounds, making it convenient to transport and store.

When activated, the reserve battery assembly 101 can provide at least 200 amperes of electrical current, at a voltage of at least 12 volts. For better performance, however, the battery assembly can provide 300 amperes, and more preferably 400 amperes. Such current levels are achievable using the battery chemistries described above, within the specified size and weight limitations.

In use, the reserve battery assembly 101, still in its storage configuration, is placed in proximity to a discharged or malfunctioning main battery 603. The cable-chamber door 120 is opened, and the first and second cable assemblies 108 and 109 are extended from the cable chamber 123. The first cable assembly jumper clip 403 is attached to the cable connector 604 over the main battery's negative terminal 605, thus connecting the first lead (not shown) to that negative battery terminal. In addition, the second cable assembly jumper clip 404 is attached to the cable connector 606 over the main battery's positive terminal 607, thus connecting the second lead (not shown) to that positive battery terminal.

The start-mode button 601 is then depressed. If the start-mode indicator 602 illuminates green, it is deduced that the main battery 603 is discharged, but still functional. The start-mode indicator may then be released, and the knob 501 rotated to activate the reserve battery assembly 101, placing it in its activation configuration. The electrolyte solvent thereby mixes with the anhydrous electrolytic crystals 104, to form a concentrated electrolyte. The anodes 105 and cathodes 106 are submerged in the concentrated electrolyte, energizing the reserve battery. The reserve battery has an adequate capacity to start a conventional automobile engine, and the engine may be started with power from the connected and activated reserve battery, without the need to wait for the main battery to be recharged by the reserve battery.

Figure 10:
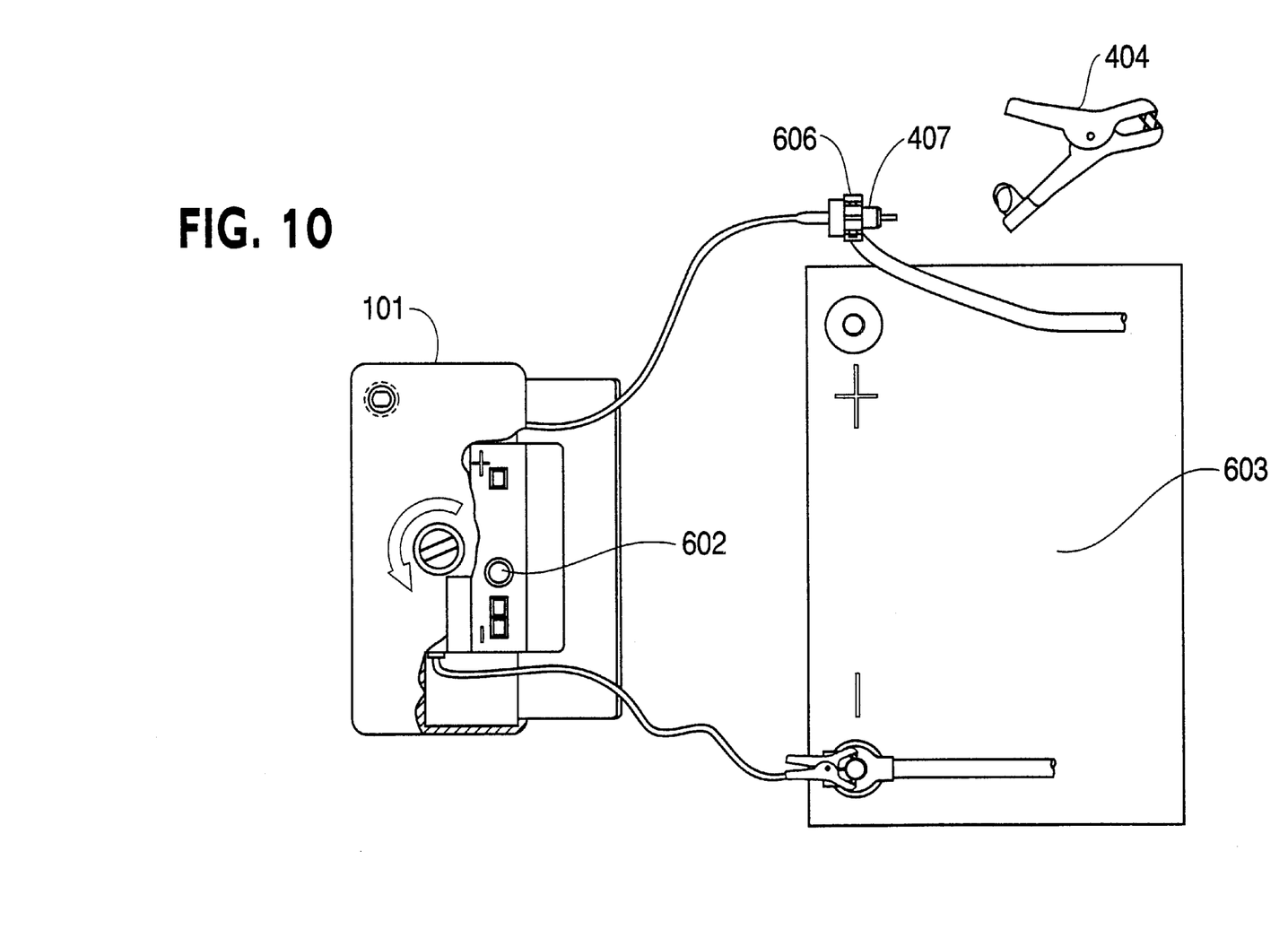
FIG. 10 is a top plan view of the reserve battery assembly depicted in FIG. 1A, connected to a vehicle with the main battery removed from the circuit.

If, on the other hand, the start-mode indicator 602 illuminates red, it is deduced that the main battery 603 is non-functional and might be shorted out. Thus, with reference to FIG. 10, the positive cable connector 606 must then be removed from the main battery, and the jumper clip 404 must be removed from the second cable assembly lug 407. The positive cable connector may then be directly attached to the lug, thus connecting the reserve battery 101 to the vehicle engine's starter motor while removing the main battery from the circuit. The positive cable connector connection to the lug has a much greater surface area than that provided by an alligator jumper clip, and it thus provides for a superior electrical and physical connection. The reserve battery assembly, with its superior connection, may then be left connected to the vehicle while the vehicle is driven to a repair facility. The reserve battery assembly need not have a recharge capability, but it does have an adequate capacity to support additional restarts of the vehicle's engine, if required on the trip to the repair facility.

From the foregoing description, it will be appreciated that the present invention provides a reserve battery assembly providing adequate voltage and power levels to replace a main battery for a limited period of time. The reserve battery assembly has an indefinite shelf life in its storage configuration. Moreover, its construction is durable, and the risk of electrolyte leakage is reduced by the use of an electrolyte solvent that will not harm the battery's O-ring seals. The reserve battery assembly is significantly smaller than a rechargeable lead-acid battery of similar voltage, and it has a significantly lighter weight. The reserve battery assembly is convenient to use in that it incorporates integral cable assemblies, it can test for battery condition prior to activation, and it can accommodate discharged or malfunctioning main batteries. Furthermore, it has a simple construction, with few moving parts, and is thus inexpensive. Furthermore, the chemical components are selected to be environmentally safe.

While a particular form of the invention has been illustrated and described, it will be apparent that various modifications can be made without departing from the spirit and scope of the invention. For example, while a gravity fed system has been shown for the electrolyte, other systems, such as pressure fed, spring fed, compressed gas fed, and the like, are contemplated as within the scope of the invention. Thus, although the invention has been described in detail with reference only to the preferred embodiment, those having ordinary skill in the art will appreciate that various modifications can be made without departing from the invention. Accordingly, the invention is defined only with reference to the following claims.

We claim:

1. A reserve battery assembly, comprising:
  a housing that defines a cell chamber and a fluid reservoir;
  a fluid sealed within the fluid reservoir;
  an openable sealing mechanism that prevents the fluid within the fluid reservoir from entering the cell chamber, but that selectively releases the fluid into the cell chamber, whereupon the fluid functions as an electrolyte;
  a plurality of pairs of anodes and cathodes disposed in the cell chamber so as to be submerged in the electrolyte after the fluid has been released into the cell chamber;
  a first lead; and
  a second lead;
  wherein the first and second leads are integrally interconnected with the plurality of pairs of anodes and cathodes such that, after the fluid has been released into the cell chamber, a predetermined voltage is provided between the leads; and wherein the opening of the sealing mechanism opens a vent passage between the fluid reservoir and the exterior of the housing.

2. The reserve battery assembly according to claim 1, and further comprising a vent valve configured to vent the cell chamber at a pressure that is higher than the pressure outside of the housing.

3. A reserve battery assembly, configured for use with a main battery, comprising:

a housing that defines a cell chamber and a fluid reservoir;

a fluid, sealed within the fluid reservoir;

an openable sealing mechanism that prevents the fluid within the fluid reservoir from entering the cell chamber, but that selectively releases the fluid into the cell chamber, whereupon the fluid functions as an electrolyte;

a plurality of pairs of anodes and cathodes disposed in the cell chamber so as to be submerged in the electrolyte after the openable sealing mechanism has released the fluid into the cell chamber;

a first cable assembly having a proximal end and a distal end, the distal end including an alligator jumper clip;

a second cable assembly having a proximal end and a distal end, the distal end including an alligator jumper clip and further including a lug configured for receiving a battery cable connector; and a voltage indicator for indicating whether the main battery should be bypassed to be jumped, wherein the indicator includes one lead connected to the first cable assembly and another lead connected to the second cable assembly;

wherein the first cable assembly and the second cable assembly are integrally interconnected with the plurality of pairs of anodes and cathodes, such that, when the fluid is released into the cell chamber, a predetermined voltage is provided between the cable assemblies.

4. The reserve battery assembly according to claim 3, wherein at least one of the voltage indicator leads includes a switch for connecting and disconnecting the voltage indicator across the first and second cable assemblies.

5. A battery assembly, comprising:

a housing that defines a cell chamber;

an electrolyte carried within the cell chamber;

a plurality of pairs of anodes and cathodes disposed in the cell chamber, submerged in the electrolyte;

a first cable assembly having a proximal end and a distal end, the distal end including an alligator jumper clip;

a second cable assembly having a proximal end and a distal end, the distal end including an alligator jumper clip and further including a lug configured for receiving a battery cable connector; and a voltage indicator for indicating the voltage between the first and second cable assemblies, wherein the voltage indicator includes one lead connected to the first cable assembly and another lead connected to the second cable assembly;

wherein the first cable assembly and the second cable assembly are integrally interconnected with the plurality of pairs of anodes and cathodes, such that, a predetermined voltage is provided between the cable assemblies.

6. The battery assembly according to claim 5, wherein at least one of the voltage indicator leads includes a switch for connecting and disconnecting the voltage indicator across the first and second cable assemblies.

7. A reserve battery assembly, comprising:

a housing that defines a cell chamber and a fluid reservoir;

an electrolyte solvent, sealed with the fluid reservoir;

an openable sealing mechanism that prevents the electrolyte solvent within the fluid reservoir from entering the cell chamber, but that selectively releases the electrolyte into the cell chamber and wherein the opening of the sealing mechanism opens a vent passage between the fluid reservoir and the exterior of the housing;

a plurality of pairs of anodes and cathodes disposed in the cell chamber so as to be submerged in the electrolyte solvent when the electrolyte solvent is released into the cell chamber;

a first lead; and a second lead;

wherein the sealing mechanism includes a chute leading from the fluid reservoir to the cell chamber, the chute containing anhydrous electrolytic crystals for dissociation in the electrolyte solvent;

wherein the electrolyte solvent passes through the chute when the electrolyte solvent is released from the fluid reservoir into the cell chamber; and wherein the first lead and the second lead are integrally interconnected with the plurality of pairs of anodes and cathodes, such that, when the electrolyte solvent is released into the cell chamber, a predetermined voltage is provided between the first and second leads.

8. The reserve battery assembly according to claim 7, further comprising a vent valve configured to vent the cell chamber at a pressure that is higher than the pressure outside of the housing.

9. A method of jump-starting a vehicle engine having two cable connectors that are connected separately over the negative and positive terminals of a depleted main battery, comprising:

providing a reserve battery assembly as defined in claim 3, configured such that the predetermined voltage is suitable for jump-starting the vehicle engine;

connecting the first cable assembly jumper clip to the cable connector over the negative terminal;

connecting the second cable assembly jumper clip to the cable connector over the positive terminal;

activating the indicator for indicating whether the main battery should be bypassed;

if the indicator indicates the main battery should be bypassed, then removing the cable connector connected over the main battery positive terminal from the positive terminal and connecting the removed cable connector over the lug on the second cable assembly;

opening the sealing mechanism to activate the reserve battery; and starting the vehicle engine, with power from the connected and activated reserve battery.

* * * * *